United States Patent [19]

Nakagawa et al.

[11] Patent Number: 5,499,037
[45] Date of Patent: Mar. 12, 1996

[54] LIQUID CRYSTAL DISPLAY DEVICE FOR DISPLAY WITH GRAY LEVELS

[75] Inventors: Kenichi Nakagawa; Takaji Numao, both of Nara, Japan

[73] Assignee: Sharp Kabushiki Kaisha, Osaka, Japan

[21] Appl. No.: 261,234

[22] Filed: Jun. 14, 1994

Related U.S. Application Data

[63] Continuation of Ser. No. 863,467, Apr. 1, 1992, abandoned, which is a continuation of Ser. No. 410,306, Sep. 21, 1989, abandoned.

[30] Foreign Application Priority Data

Sep. 30, 1988 [JP] Japan .................... 63-248800

[51] Int. Cl.⁶ .................................................. G09G 3/36
[52] U.S. Cl. ............................ 345/89; 345/87; 345/103
[58] Field of Search ............................ 345/87, 89, 103, 345/147, 149; 359/54, 61, 87; 358/455, 456, 458, 459

[56] References Cited

U.S. PATENT DOCUMENTS

| 3,647,958 | 3/1972 | Sobel | 340/793 |
| 4,531,160 | 7/1985 | Ehn | 340/793 |
| 4,661,809 | 4/1987 | Anderson et al. | 340/793 |
| 4,712,877 | 12/1987 | Okada et al. | 340/793 |
| 4,791,417 | 12/1988 | Bobak | 340/793 |
| 4,850,675 | 7/1989 | Hatanaka et al. | 340/793 |

FOREIGN PATENT DOCUMENTS

| 236198 | 2/1987 | European Pat. Off. . |
| 261898 | 9/1987 | European Pat. Off. . |
| 271960 | 12/1987 | European Pat. Off. . |
| 60-70815 | 4/1987 | Japan . |
| 62-244018 | 10/1987 | Japan . |
| 63-229430 | 9/1988 | Japan . |

OTHER PUBLICATIONS

"Collection of Papers for the 13th Symposium on Liquid Crystals" pp. 138–139, Sponsored by Japan Society of Applied Physics, Chemical Society of Japan and Society of Polymer Science Japan.
"Conference Record of the 1988 International Display Research Conference" Oct. 4–6, 1988, pp. 111–113, Institute of Elec. and Electronics Engineers, Inc., SID, Advisory Gp. on Electron Dev.

*Primary Examiner*—Richard Hjerpe
*Assistant Examiner*—Matthew Luu

[57] ABSTRACT

A liquid crystal display device has an arrangement of a plurality of pixel display regions each including a plurality of divided pixels, and is capable of effecting display with a large number of gray levels. Each of the divided pixels is displayed individually and selectively with at least two gray levels. The liquid crystal device further includes pixel electrodes for individually and selectively enabling the divided pixels, and a gray level setting circuit for controlling the sum of the areas of the enabled divided pixels, thereby setting the gray levels of the pixels. In this device, one pixel display region includes n divided pixels and if each pixel can be displayed with m gray levels, the areas of the pixels are set to form a geometric progression using m as a common ratio, whereby display with $m^n$ gray levels for one display region can be effected with high precision.

2 Claims, 8 Drawing Sheets

PERCENTAGE OF OCCUPIED AREA

| PIXEL NUMBER | 21 | 22 | 23 | 24 | |
|---|---|---|---|---|---|
| RATIO OF AREAS | 8 | 4 | 2 | 1 | |
| | 53.4% | 26.7% | 13.3% | 6.7% | |
| 1 | 0 | 0 | 0 | 0 | 0 % |
| 2 | 0 | 0 | 0 | 1 | 6.7 |
| 3 | 0 | 0 | 1 | 0 | 13.3 |
| 4 | 0 | 0 | 1 | 1 | 20.0 |
| 5 | 0 | 1 | 0 | 0 | 26.7 |
| 6 | 0 | 1 | 0 | 1 | 33.3 |
| 7 | 0 | 1 | 1 | 0 | 40.0 |
| 8 | 0 | 1 | 1 | 1 | 46.7 |
| 9 | 1 | 0 | 0 | 0 | 53.3 |
| 10 | 1 | 0 | 0 | 1 | 60.0 |
| 11 | 1 | 0 | 1 | 0 | 66.7 |
| 12 | 1 | 0 | 1 | 1 | 73.3 |
| 13 | 1 | 1 | 0 | 0 | 80.0 |
| 14 | 1 | 1 | 0 | 1 | 86.7 |
| 15 | 1 | 1 | 1 | 0 | 93.3 |
| 16 | 1 | 1 | 1 | 1 | 100 % |

(GRAY LEVEL on left axis; DISPLAY DENSITY on right axis)

PERCENTAGE OF OCCUPIED AREA

| PIXEL NUMBER | 21 | 22 | 23 | 24 | |
|---|---|---|---|---|---|
| RATIO OF AREAS | 8 | 4 | 2 | 1 | |
| | 53.4% | 26.7% | 13.3% | 6.7% | |

| GRAY LEVEL | | | | | DISPLAY DENSITY |
|---|---|---|---|---|---|
| 1 | 0 | 0 | 0 | 0 | 0 % |
| 2 | 0 | 0 | 0 | 1 | 6.7 |
| 3 | 0 | 0 | 1 | 0 | 13.3 |
| 4 | 0 | 0 | 1 | 1 | 20.0 |
| 5 | 0 | 1 | 0 | 0 | 26.7 |
| 6 | 0 | 1 | 0 | 1 | 33.3 |
| 7 | 0 | 1 | 1 | 0 | 40.0 |
| 8 | 0 | 1 | 1 | 1 | 46.7 |
| 9 | 1 | 0 | 0 | 0 | 53.3 |
| 10 | 1 | 0 | 0 | 1 | 60.0 |
| 11 | 1 | 0 | 1 | 0 | 66.7 |
| 12 | 1 | 0 | 1 | 1 | 73.3 |
| 13 | 1 | 1 | 0 | 0 | 80.0 |
| 14 | 1 | 1 | 0 | 1 | 86.7 |
| 15 | 1 | 1 | 1 | 0 | 93.3 |
| 16 | 1 | 1 | 1 | 1 | 100 % |

(1)

(5)

(9)

(13)

(2)

(6)

(10)

(14)

(3)

(7)

(11)

(15)

(4)

(8)

(12)

(16)

5,499,037

1

LIQUID CRYSTAL DISPLAY DEVICE FOR DISPLAY WITH GRAY LEVELS

This application is a continuation of application Ser. No. 07/863,467 filed on Apr. 1, 1992, which is a continuation of Ser. No. 07/410,306, filed on Sep. 21, 1989, both now abandoned.

BACKGROUND OF THE INVENTION

1. Field of the Invention

The present invention relates to liquid crystal display devices and particularly to a liquid crystal display device which displays a large number of gray levels with a high precision.

2. Description of the Background Art

Multiplex drive type liquid crystal display devices are widely utilized as liquid display devices. Such a drive type device uses liquid crystal interposed between two sets of strip electrode groups arranged oppositely to have the directions thereof intersecting with each other. The liquid crystal is driven by a drive circuit connected to each of the strip electrode groups.

Referring to FIGS. 1 to 3, a conventional multiplex drive type liquid crystal display device comprises: glass plates 103 and 104 having polarization plates 101 and 102 on the outer sides thereof, respectively; pixel electrodes 105 and 106 formed on the inner sides of the glass plates 103 and 104, respectively; a liquid crystal 107 enclosed in a space surrounded by the glass plates 103, 104 and a frame 108; a data drive circuit 110 connected to the pixel electrodes 105; and a scanning drive circuit 109 connected to the pixel electrodes 106.

The pixel electrodes 105 connected to the data drive circuit 110 are called data electrodes. The pixel electrodes 106 connected to the scanning drive circuit 109 are called scanning electrodes. Interconnections between the data electrodes 105 and the scanning electrodes 106 constitute pixels 111.

Referring to FIGS. 1 to 3, the operation principle of the conventional device will be described. A twisted nematic type liquid crystal is used in this device. A liquid crystal display device using a twisted nematic type liquid crystal is hereinafter referred to as TN-LCD. The scanning drive circuit 109 selects the scanning electrodes 106 in order and applies successively a pulse voltage thereto. The data drive circuit 110 applies a signal pulse voltage to the data electrodes 105. In each pixel 111 connected to the scanning electrode 106 to which the pulse voltage is applied, the direction of liquid crystal molecules of the liquid crystal changes depending on the potential difference between the scanning electrode 106 and the data electrode 105.

Referring to FIG. 1, light incident on any pixel from the direction A is polarized in advance by polarization plate 101. When the voltage is not applied to the pixel, the polarization plane of the incident light is rotated by the liquid crystal molecules in the liquid crystal 107. Consequently, if the polarizing directions of the polarization plates 102 and 101 are set parallel, the light transmitted by the liquid crystal 107 cannot pass through polarization plate 102. Viewed from the direction opposite to the direction A, this pixel shown in FIG. 1 is in a non-selected state and forms a dark point.

When the voltage is applied to an arbitrary pixel, the liquid crystal molecules in the liquid crystal 107 change their direction in response to a change in electric field. The

2 length direction of those liquid crystal molecules changes to a direction perpendicular to the pixel electrode. Thus, the direction of each liquid crystal molecule changes to be in parallel with the light travelling direction. As a result, the polarization plane of the light travelling in the liquid crystal does not change. The incident light passes through the polarization plate 102. When viewed from the direction opposite to the direction of the arrow A, the pixel 111 is in a selected state and forms a bright point. When the voltage is applied to the pixels selectively, only the selected pixels form bright points and form a contrast between the non-selected pixels. As a result, an image is represented by the combination of the pixels in the selected state and the pixels in the non-selected state.

The above described example was explained by using the TN-LCD. Also in the case of a liquid crystal display device using other types of liquid crystal, the same operation as described above is carried out in principle. As will be understood from the foregoing description, the LCD is in principle suited for binary display.

In a multiplex drive type liquid crystal display device, three methods for representing more than two gray levels for each pixel are proposed. One of the methods utilizes a correspondence relation between the voltage applied to each pixel and the intensity of the transmitted light. The second method is a method of changing the frequency of application of the voltage to a pixel according to the gray level by which the pixel is to be displayed. The third method is to control the ratio between the area in a bright state and the area in a dark state in a pixel.

A relation as shown in FIG. 4 exists between the voltage applied to the liquid crystal and the intensity of the transmitted light. The first method is mainly used in the TN-LCD. This method utilizes the relation as shown in FIG. 8. According to this method, the magnitude of the electric field applied to the liquid crystal of each pixel is controlled in plural manners so that a display with gray levels can be realized.

Referring to FIG. 4, the abscissa represents the voltage applied to a pixel and the ordinate represents the intensity of the transmitted light in the pixel. If the voltage applied to the pixel increases, the transmitted light intensity in the pixel begins to change at a prescribed threshold voltage $V_{TH}$. If the applied voltage is higher than the threshold voltage $V_{TH}$, the transmitted light intensity increases substantially linearly according to the increase of the applied voltage and it is saturated at a saturation voltage $V_S$.

In the following, a method of controlling the voltage applied to the pixels for displaying the pixels with eight gray levels will be described. It is assumed that the maximum transmitted light intensity is 1. It is also assumed that the transmitted light intensity corresponding to the threshold voltage $V_{TH}$ is 0. The difference between $V_{TH}$ and $V_S$ is divided into seven equal parts, and the start point, the division points and the end point are defined as $V_{TH}=V_0$ and $V_1, V_2, \ldots, V_7=V_S$. In order to display a certain pixel with the fifth gray level, a voltage corresponding to the potential difference $V_4$ may be applied between the data electrode and scanning electrode of that pixel. The transmitted light intensity in that case will be about 4/7. In the LCD using this method, a display with 16 gray levels can be attained.

The second method for display with gray levels will be described. According to this method, the frequency of application of the voltage to each pixel changes in plural manners, whereby the pixels are displayed with gray levels. This method is mainly used in a super-twisted nematic type liquid crystal display device (hereinafter referred to simply as STN-LCD) and in a ferroelectric liquid crystal display device (hereinafter referred to simply as FLCD).

The number of times one pixel is set in a selected state for a unit period is called the frequency of excitation of the pixel. This frequency is adapted to the gray level with which the corresponding pixel is to be displayed, whereby the pixel is displayed with the desired level. A method for displaying the respective pixels with 256 gray levels will be described in the following.

The brightest gray level is defined as the 256th level and the darkest gray level is defined as the first gray level. The pixel of the 256th gray level is selected 255 times for the unit period, while the pixel of the first gray level is selected 0 times. In other words, the pixel of the first gray level is not selected at all. As for the second to 255th gray levels, the respective pixels are selected (n−1) times for the unit period with respect to the corresponding gray levels n. If the above mentioned unit period is sufficiently short, it appears to the naked eye that the respective pixels are displayed with the gray levels corresponding to the respective frequencies of excitation.

The third method will be described in the following. According to the third method, the areas in the bright state and in the dark state in the respective pixels are controlled. This method is mainly used in FLCD. An example of the device using this method is described for example in "Collection of Papers for the 13th Symposium on Liquid Crystals sponsored by the Japan Society of Applied Physics, the Chemical Society of Japan and the Society of Polymer Science Japan" pages 138 et seq.

FIG. 6 is a schematic sectional view of one pixel used in this method. This pixel includes normal elements described previously at the beginning of the description of the background art. Plural concavo-convex forms having a depth d1 are formed with pitches d2 on a surface of the substrate 103. A pixel electrode 105 is deposited thereon.

Because of the concavo-convex forms, even if the voltage applied to this pixel is uniform in the electrode of one pixel, the intensity of electric field differs dependent on difference in gaps between the respective pixel electrodes. In a display with intermediate gray levels, if a certain voltage is applied, the intensity of the electric field becomes larger than a certain value where the above mentioned gap is smaller than a value determined by the applied voltage, and a bright state is set in that area while the other area remains in a dark state. The transmitted light intensity of the entire area of this pixel appears to be an intermediate level for the naked eye according to the ratio of the areas in the bright state and in the dark state.

As shown in the example of FIG. 7, by changing the applied voltage, it is possible for the transmitted light intensity of the pixel to have a value corresponding to the applied voltage. The display with gray levels by utilizing the above mentioned relation, is based on the operation principle of a liquid crystal display device according to the third method. FIG. 7 is a graph representing the relation between the applied voltage and the transmitted light intensity according to the above mentioned method. It is to be noted that in the LCD of the example shown in this graph, the polarizing directions of the polarization plates 101 and 102 are combined to set a dark state when the voltage is applied and to set a bright state when the application of the voltage is cancelled.

The above-described display with gray levels is mainly utilized for color display. For instance in a computer terminal, it is presently possible to display $16^3$, i.e., 4096 different colors, by displaying each of the three primary colors with 16 gray levels. In order to attain a more natural tone, it is necessary to effect display with more than 16 gray levels with high precision. However, any of the above-described three methods for display with gray levels is not suited for high-precision display with a large number of gray levels such as 16 to 256 gray levels.

The first method involves the following disadvantages. According to this method, as shown in FIG. 8, the difference between the transmitted light intensity corresponding to the saturation voltage $V_S$ and the transmitted light intensity corresponding to the threshold voltage $V_{TH}$ can be divided by a desired number of gray levels to be realized. The difference of the two voltages corresponding to the adjacent gray levels is substantially equal to a value obtained by dividing the difference of the saturation voltage $V_S$ and the threshold voltage $V_{TH}$ by the desired number of gray levels minus 1. The above mentioned voltage difference becomes smaller according to the increase of the number of gray levels. Accordingly, a large number of gray levels requires a drive technique of extremely high precision.

Even if a drive technique for selecting an applied voltage with high precision is realized, it is necessary for a liquid crystal layer used to have a high evenness. Otherwise, irregularities would occur in the transmitted light intensity in the respective pixels with respect to the same applied voltage, making it difficult to represent correct gray levels. For the above described reasons, it is impossible, with a large number of gray levels such as 16 to 256 levels, to effect a display with high precision according to the first method.

According to the second method, display with desired gray levels should be obtained theoretically. However, in reality, problems as described below are involved. In order to obtain an image without flickering by normal gray level display, the time for scanning all the pixels needs to be less than about 16 msec. This is because 60 frames are displayed for one second in a television set for example. In such a case, each pixel is scanned once at intervals of 16 msec.

According to this second method, it is necessary to further divide each period of 16 msec according to the number of gray levels and scanning needs to be effected by using the divided minimum unit time thus obtained. This period is about 2.3 msec in the case of 8 gray levels. It is about 1.1 msec in the case of 16 gray levels and it is as short as 0.06 msec in the case of 256 gray levels. At present, it is impossible to scan all the pixels for such a short period.

The third method involves the below described problems. According to this third method, gray levels are represented by a ratio of the areas in the bright state and in the dark state in one pixel. However, in the same manner as in the first method, it is necessary to apply, to the corresponding pixel, a voltage regulated with high precision according to a gray level to be represented. For this reason, a drive device having high precision is required. Furthermore, in a display device using this method, it is impossible to control the areas in the bright state and the areas in the dark state in one pixel. Consequently, it is also impossible to effect a precise display with gray levels.

SUMMARY OF THE INVENTION

Therefore, an object of the present invention is to provide a liquid crystal display device capable of effecting display with a large number of gray levels with high precision.

According to an aspect of the present invention, a liquid crystal display device comprises a liquid crystal display panel including an arrangement of a plurality of pixel display regions. Each pixel display region includes a predetermined plural number of divided display regions. Each divided display block can be displayed individually and selectively with at least two gray levels. The liquid crystal display device according to the present invention includes, in each pixel display region, a display drive device for enabling, individually and selectively, the divided display blocks, and a gray level attaining circuit coupled to the display drive device, for controlling the number of divided display blocks to be enabled for each pixel display region to attain a gray level for each pixel display region.

It is only necessary for the respective divided display blocks to be displayed with at least two or more gray levels. This can be easily accomplished. The gray level attaining circuit controls the number of divided display blocks to be enabled in each pixel display region, whereby the gray level in each pixel display region is obtained as a result of a weighted mean of the gray levels in the respective divided display blocks, and the sums of the areas of those pixel. Consequently, display with a large number of gray levels can be effected by selection of divided display blocks.

Thus, the liquid crystal display device capable of performing display with a large number of gray levels with high precision can be provided.

According to another aspect of the present invention, a liquid crystal display device comprises a liquid crystal display panel including an arrangement of a plural number of pixel display regions. Each pixel display region includes n divided display blocks. Each divided display block is displayed individually and selectively with m gray levels. The areas of the respective divided display blocks are selected to form a geometric progression using m as a common ratio. The gray level attaining circuit controls gray, levels of the divided display blocks for each pixel display region.

The area of each divided display block is selected as described above and the number of gray levels for the divided display blocks is controlled by m combinations. In consequence, the sums of the selected areas of the divided display blocks times the gray level thereof, constitute an arithmetic progression of $m^n$ different values. Accordingly, the liquid crystal display device can effect a display with $m^n$ gray levels with high precision. In addition, it is required for each divided display block to be displayed with only m combinations of gray levels. Those displays can be easily controlled by the conventional techniques. Thus, the liquid crystal display device capable of easily effecting display with numbers of gray levels with high precision can be provided.

According to a further aspect of the present invention, the first divided display block of the smallest area is located at the center of a pixel. The other divided display blocks are divided into an even number of partial sections, which are arranged to form a point symmetry with respect to the first divided display block. Accordingly, partial imbalance of display densities rarely occurs in intermediate gray level representation and the quality of the image can be improved. Thus, a liquid crystal display device which is capable of easily effecting display with many gray levels with high precision and with a good quality of image, can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A liquid crystal display device according to the present invention has been developed based on the following concept. A number $n_0$ of adjacent pixels in a liquid crystal display panel are assumed to form one display unit. Each display unit is formed by intersection of k scanning electrodes and l data electrodes. Consequently, $n_0=k \cdot l$ ($n_0$, k and l being natural numbers). Some of $n_0$ pixels are connected to be electrically equivalent. Thus, some pixels are electrically connected to be always in an equal display state, whereby those pixels are regarded as one pixel group. All the pixels in one display unit are divided into n pixel groups.

Each pixel can be displayed with m gray levels. The gray levels of each pixel include the level in the brightest state and the level in the darkest state. When the areas of the respective pixel portions are set to a specified ratio, the number of gray levels displayable for one display unit is the largest and display with gray levels can be effected at equal intervals of density. This is made clear as a result of studies by the inventors of the present application.

It is assumed that n pixel groups exist in one display unit and that each pixel is displayable with m gray levels. The most suitable ratio of the areas obtained is as follows.

$$A_1:A_2:\ldots:A_n = m^{n-1}:m^{n-2}\ldots:1$$

where $A_i$ ($i=1, 2, \ldots, n$) represents the total of the areas of all the pixels included in the ith pixel group in one display unit. One display unit having the electrode structure thus designed is capable of representing $m^n$ gray levels at intervals of $100/(m^n-1)$ % from the display density 0% to the display density 100%.

A large number $m^n$ is obtained as the number of gray levels displayed for one display unit. However, the number m of gray levels displayed for each pixel is small. Accordingly, display with many gray levels can be easily attained based on this concept. For example, 16 gray levels can be represented in the case of $m=2$ and $n=4$. In addition, 256 gray levels can be represented in the case of $m=n=4$.

Figure 1:
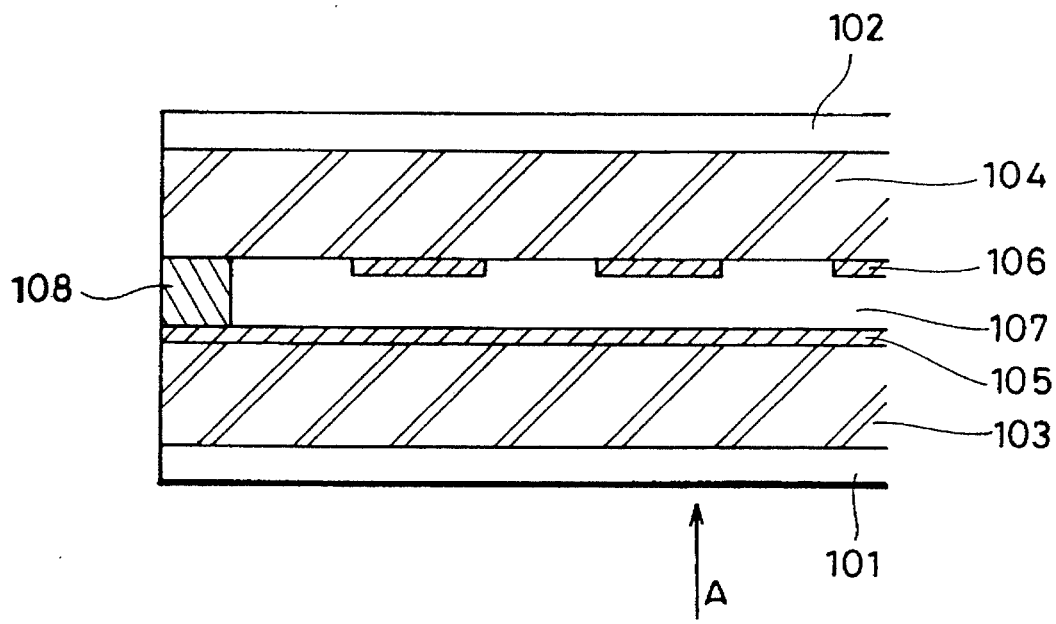
FIG. 1 is a schematic sectional view of a liquid crystal display panel of a multiplex drive type liquid crystal display device.
Figure 2:
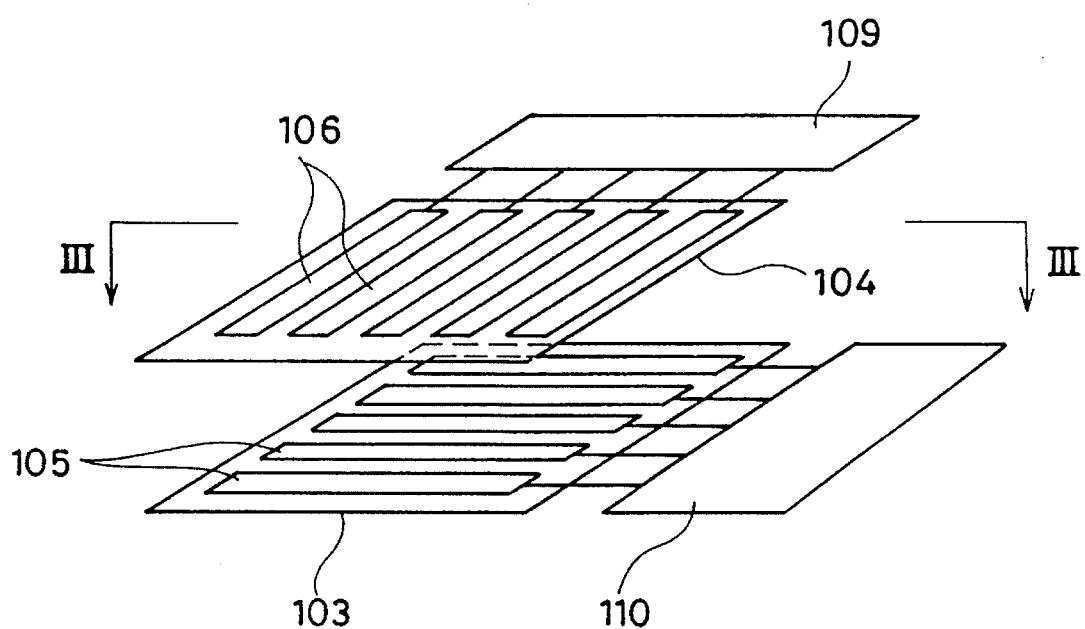
FIG. 2 is a perspective view showing an electrode structure of a multiplex drive type liquid crystal display device.
Figure 3:
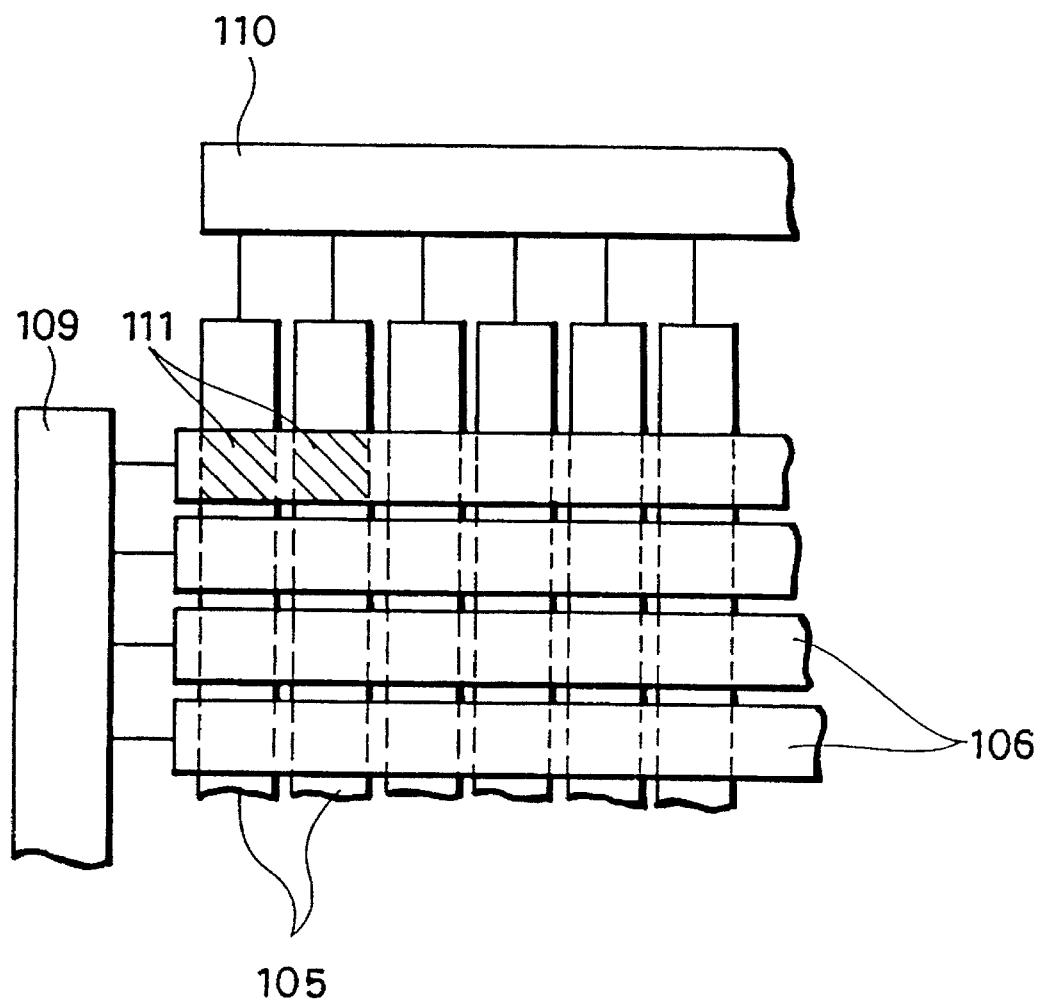
FIG. 3 is a view taken along the direction III—III in FIG. 2.
Figure 4:
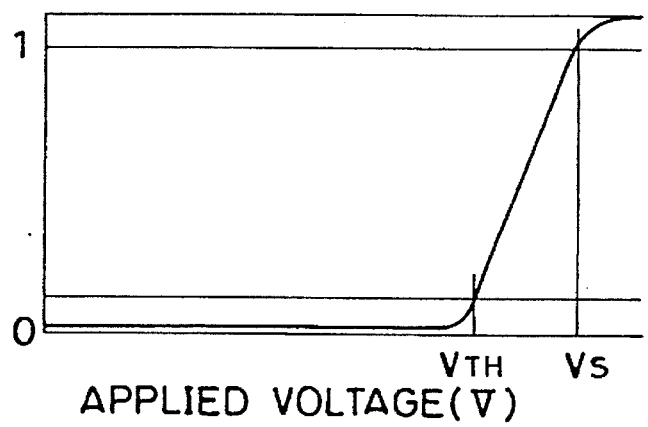
FIG. 4 is a graph showing a correspondence between applied voltage and transmitted light intensity in a TN-LCD.
Figure 5:
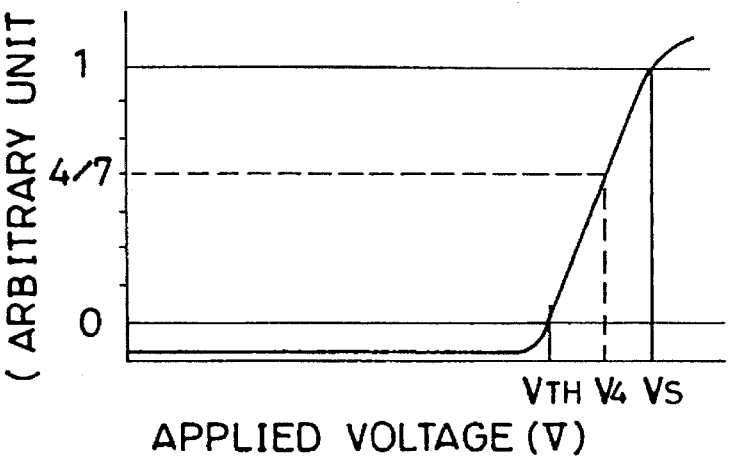
FIG. 5 is graph showing a method for obtaining a necessary applied voltage for effecting a desired gray level display in a conventional TN-LCD.
Figure 6:
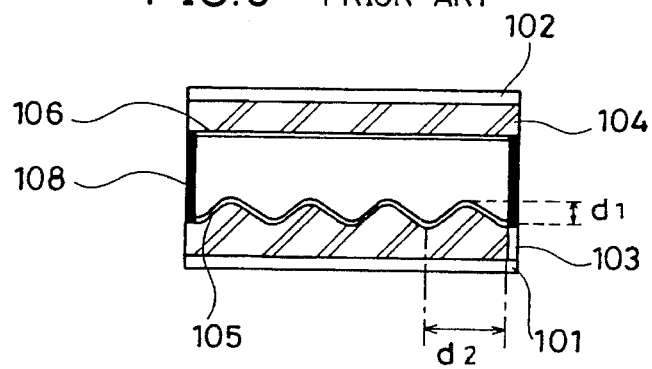
FIG. 6 is a schematic sectional view of a liquid crystal display device for effecting display with gray levels in an FLCD.
Figure 7:
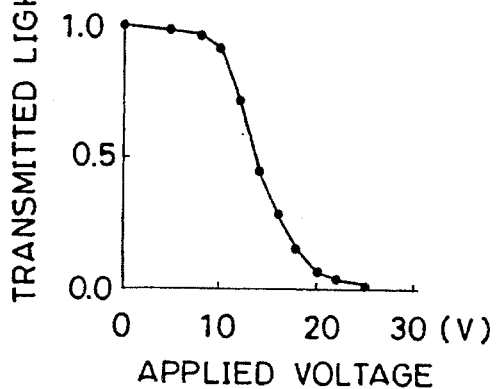
FIG. 7 is a graph for explaining the principle of a conventional method for display with gray levels.
Figure 8:
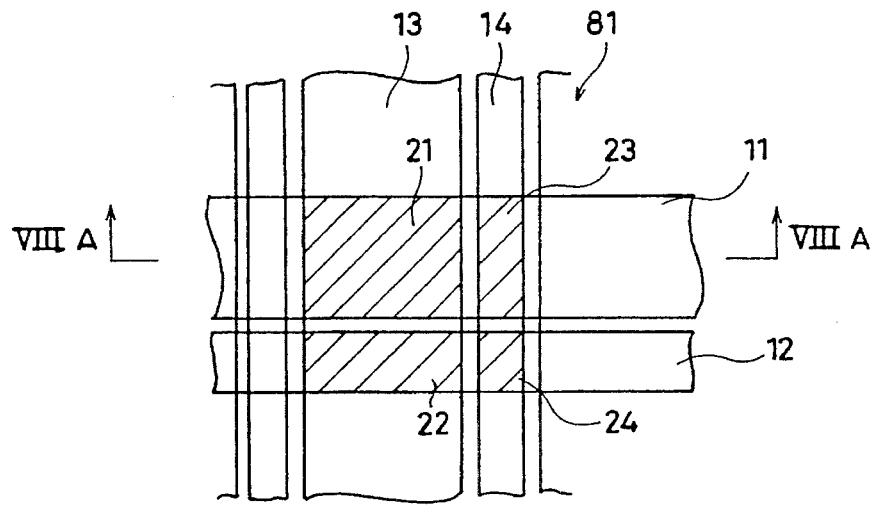
FIG. 8 is a schematic plan view showing an electrode arrangement of a liquid crystal display device according to an embodiment of the present invention.
Figures 8A, 8B:
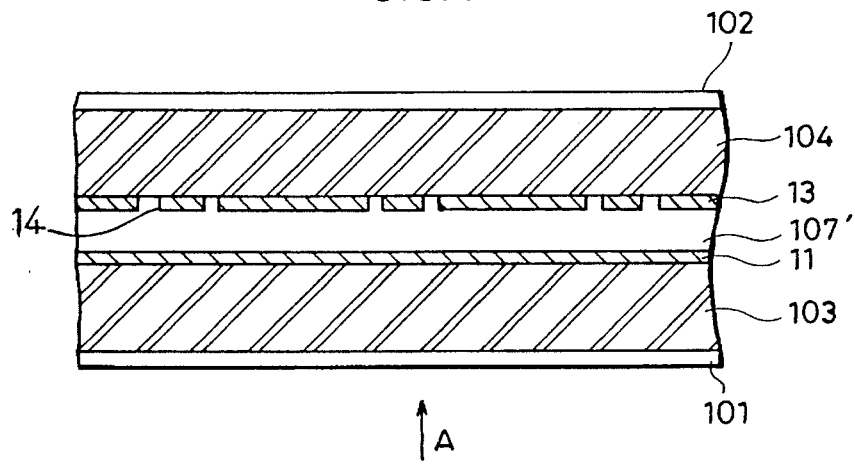
FIG. 8A is a sectional view taken along the direction VIIIA—VIIIA in FIG. 8.
FIG. 8B is a table showing selected states of pixels for effecting display with 16 gray levels in the liquid crystal display of the embodiment.
Figure 8C:
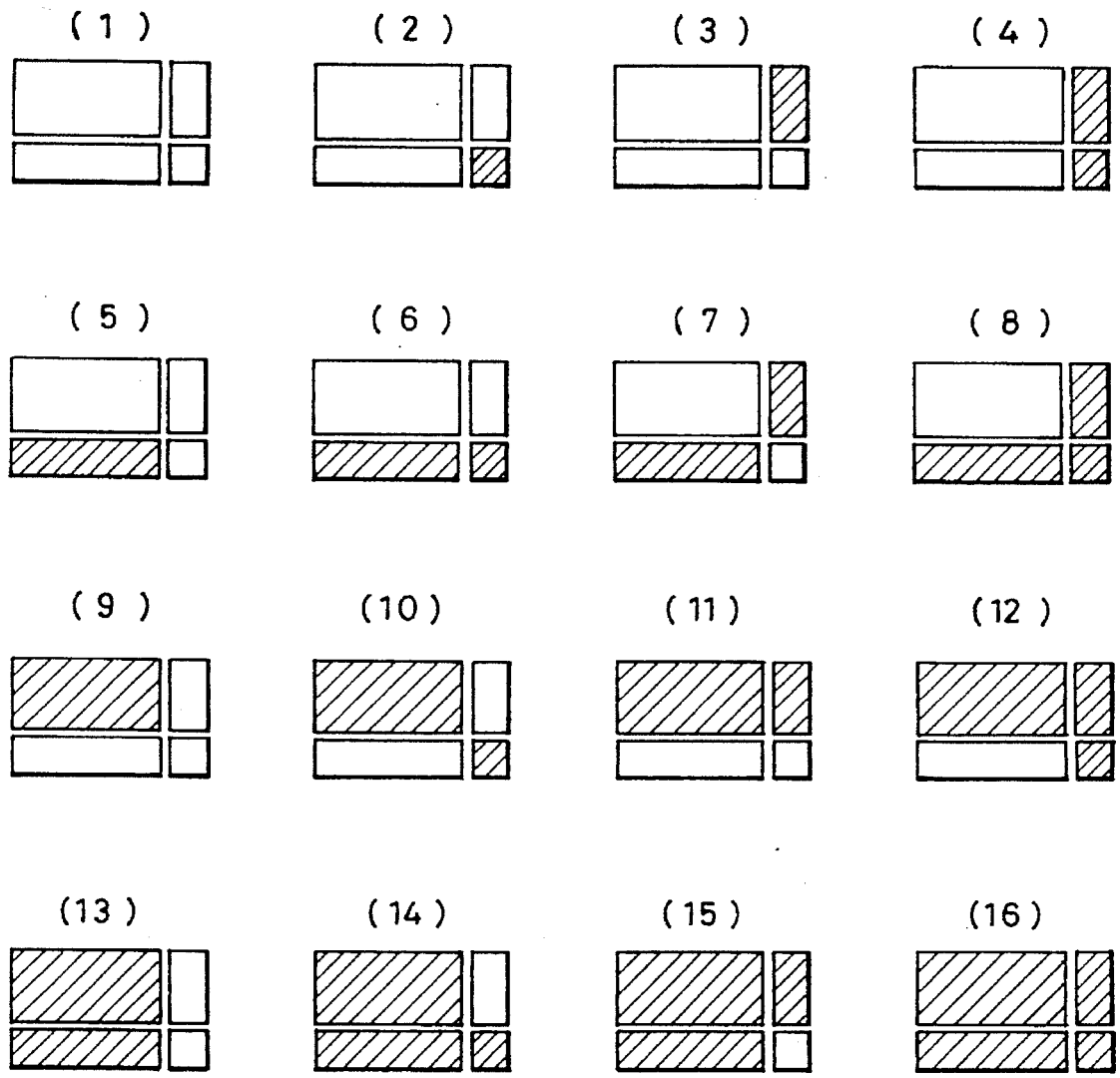
FIG. 8C is a schematic illustration showing selected states of the respective pixels for attaining 16 gray levels.

In the following, an embodiment realized based on this technical thought will be described in detail with reference to the drawings. Referring to FIGS. 8 to 8C, an STN-LCD according to an embodiment of the present invention will be described. In FIGS. 1 and 8A, the identical elements are denoted by the identical reference characters and they have the same functions. Therefore, the description thereof is not repeated. The LCD of the present invention is different from the conventional LCD in that the LCD of the present invention has a new special arrangement of scanning electrodes 11, 12 and data electrodes 13, 14.

A pair of scanning electrodes 11, 12 and a pair of data electrodes 13, 14 are arranged oppositely to intersect with each other, whereby four pixels 21 to 24 are formed and they constitute one display unit 81. A ratio of the widths of the scanning electrodes 11, 12 is selected to be 2:1. A ratio of widths of the data electrodes 13, 14 is selected to be 4:1. The pixel 21 is formed at an intersection of the scanning electrode 11 and the data electrode 13. The pixel 22 is formed at an intersection of the scanning electrode 12 and the data electrode 13. The pixel 23 is formed at an intersection of the scanning electrode 11 and the data electrode 14. The pixel 24 is formed at an intersection of the scanning electrode 12 and the data electrode 14. Accordingly, the ratio of the areas of the pixels 21, 22, 23 and 24 is 8:4:2:1.

Let us assume that the pixels 21, 22, 23 and 24 have sufficiently small sizes. In this case, the display unit 81 formed by those pixels appears to be represented uniformly with a display density obtained by a weighted mean of the areas of the display densities of those pixels.

For example, if the respective pixels 21, 22, 23 and 24 are independently displayed with two gray levels, the display unit formed by those pixels can be displayed with 16 display densities. FIGS. 8B and 8C represent the states of those 16 display densities in a corresponding relation. Referring to FIG. 8B, when only the pixel 24 is on, the display unit 81 is displayed with a display density 6.7%. When only the pixel 23 is on, the display unit 81 is displayed with a density 13.3%. Similarly, by adjusting the states of the pixels 21, 22, 23 and 24, it is possible for the display unit 81 to be displayed with 16 gray levels having constant density differences at intervals of about 6.7%.

This embodiment is related with the case of $n=4$ and $m=2$. Accordingly, the LCD of this embodiment is capable of representing $2^4$, i.e., 16 gray levels.

Second Embodiment

According to the second embodiment, an FLCD having the same electrode structure as that shown in the first embodiment and using a ferroelectric liquid crystal (FLC) was prepared. In this second embodiment also, the same control as in the STN-LCD of the first embodiment was effected, whereby it was made possible to represent 16 gray levels. Since the respective pixels are displayed with only two gray levels, it is not necessary to strictly control a precision in preparation of a liquid crystal display panel.

Because of the high speed operation and the bistability of the FLC, the LCD of this second embodiment has good response and makes it possible to obtain a stable quality of image.

Third Embodiment

Figure 9:
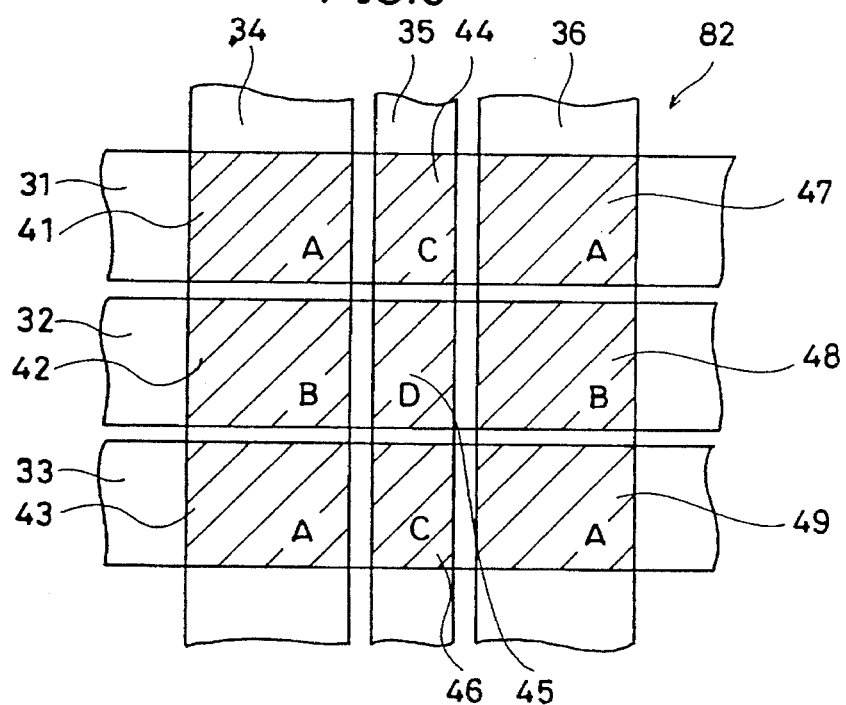
FIG. 9 is a schematic plan view showing an electrode structure of a liquid crystal display device according to another embodiment of the present invention.
Figure 10:
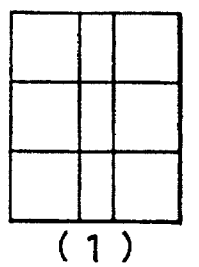
FIG. 10 is an illustration showing gray level display conditions for a display unit in the liquid crystal display device.
Figure 10:
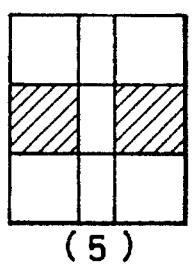
Figure 10:
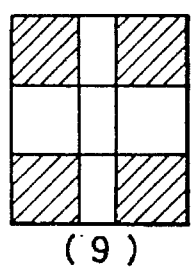
Figure 10:
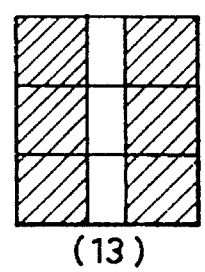
Figure 10:
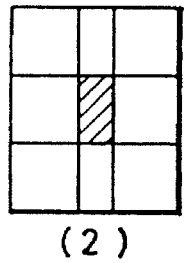
Figure 10:
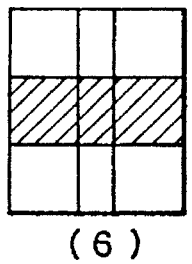
Figure 10:
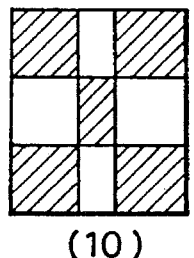
Figure 10:
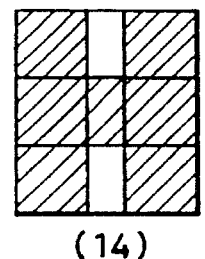
Figure 10:
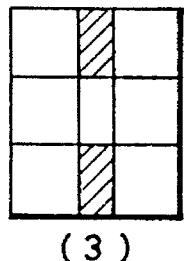
Figure 10:
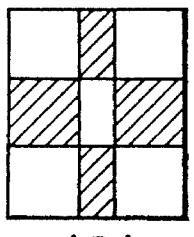
Figure 10:
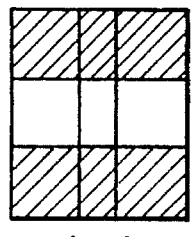
Figure 10:
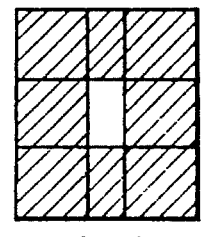
Figure 10:
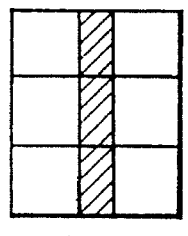
Figure 10:
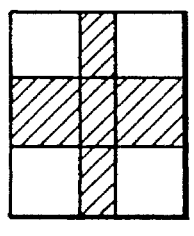
Figure 10:
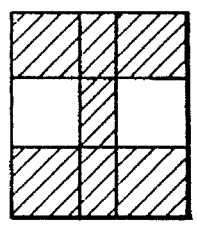
Figure 10:
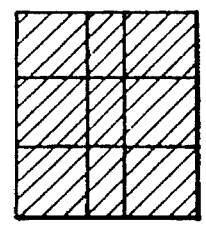

Referring to FIGS. 9 and 10, the third embodiment of the present invention will be described. An STN-LCD of this third embodiment includes a display unit 82 formed at intersections between a set of three scanning electrodes 31, 32, 33 and a set of three data electrodes 34, 35, 36. The display unit 82 includes nine pixels 41 to 49. The pixels 41, 42, 43 are formed at intersections between the scanning electrodes 31, 32, 33 and the data electrode 34. The pixels 44, 45, 46 are formed at intersections between the scanning electrodes 31, 32, 33 and the data electrode 35. The pixels 47, 48, 49 are formed at intersections between the scanning electrodes 31, 32, 33 and the data electrode 36.

A ratio of the sum of the widths of the scanning electrodes 31 and 33 to the width of the scanning electrode 32 is 2:1. In this embodiment, the widths of the scanning electrodes 31 and 33 are equal. Therefore, the ratio of the widths of the scanning electrodes 31, 32 and 33 is 1:1:1. A ratio of the sum of the widths of the data electrodes 34 and 36 and the width of the electrode 35 is 4:1. The widths of the electrodes 34 and 35 are equal. Therefore, the ratio of the widths of the electrodes 34, 35 and 36 is 2:1:2.

The ratio of the areas of the nine pixels 41 to 49 formed at the intersections of the three scanning electrodes 31, 32, 33 and the three data electrodes 34, 35, 36 is 2:2:2:1:1:1:2:2:2 as is understood from the above discussions. Since the scanning electrodes 31 and 33 are electrically connected with each other, and the data electrodes 34 and 36 are connected with each other, those nine pixels are divided into the following four groups A, B, C and D formed by electrically equivalent pixels.

A: pixels 41, 43, 47, 49

B: pixels 42, 48

C: pixels 44, 46

D: pixel 45

The ratio of the sums of the areas of the pixels of those four groups is as follows:

A:B:C:D=8:4:2:1

By selecting the pixels of those four groups in the same manner as in the case of the four pixels 21 to 24 of the first embodiment, it is possible to effect display with 16 gray levels. A pattern of selected or non-selected states of the respective pixels for each of the intermediate gray levels is shown in FIG. 10. Referring to FIG. 10, the characters attached to the respective patterns indicate the gray levels set by these patterns.

The selected states of the pixels 41 to 49 for each gray level are shown in FIG. 8B, where in this case the pixel number 21 is replaced by 41, 43, 47, 49, the pixel number 22 is replaced by 42, 48, the pixel number 23 is replaced by 44, 46, and the pixel number 24 is replaced by 45.

In this electrode structure, the geometric center of the display unit coincides with the center of the intermediate density for all the gray levels. Consequently, compared to the first and second embodiments, the LCD of the third embodiment has a better display quality.

Fourth Embodiment

Figure 11:
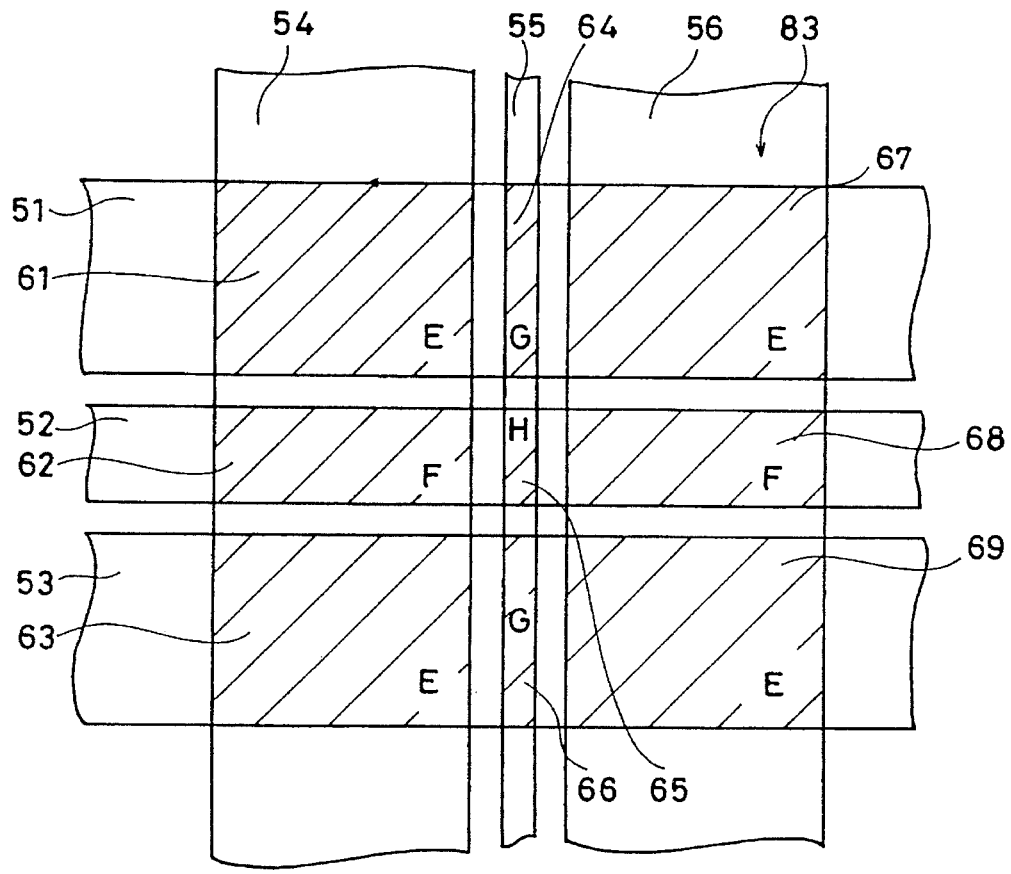
FIG. 11 is a schematic plan view showing an electrode arrangement in a liquid crystal display device according to a further embodiment of the present invention.

Referring to FIG. 11, an STN-LCD of the fourth embodiment of the invention includes a display unit 83 formed at intersections of a set of three scanning electrodes 51, 52, 53 and a set of three data electrodes 54, 55, 56. Large numbers of scanning electrodes 51, 52, 53 are arranged in parallel with each other in this order. Large numbers of data electrodes 54, 55, 56 are arranged in this order in a direction perpendicular to the direction of the scanning electrodes 51, 52, 53. Accordingly, a large number of display units 83 are arranged regularly in the vertical and horizontal directions on the liquid crystal display panel.

Each display unit 83 includes nine pixels 61 to 69. The pixels 61, 62, 63 are formed at intersections between the scanning electrodes 51, 52, 53 and the data electrode 54. The pixels 64, 65, 66 are formed at intersections between the scanning electrodes 51, 52, 53 and the data electrode 55. The pixels 67, 68, 69 are formed at intersections between the scanning electrodes 51, 52, 53 and the data electrode 56.

The ratio of the sum of the widths of the scanning electrodes 51 and 53 to the width of the scanning electrode 52 is 4:1. In this embodiment, the widths of the scanning electrodes 51, 53 are equal. Therefore, the ratio of the widths of the scanning electrodes 51, 52, 53 is 2:1:2. The ratio of the sum of the widths of the data electrodes 54 and 56 to the width of the data electrode 55 is 16:1. The widths of the data electrodes 54 and 56 are equal. Therefore, the ratio of the widths of the data electrodes 54, 55, 56 is 8:1:8.

Evidently, the ratio of the areas of the pixels 61 to 69 is 16:8:16:2:1:2:16:8:16. Since the scanning electrodes 51 and 53 are electrically connected with each other and the data electrodes 54 and 56 are electrically connected with each other, those nine pixels are divided into the following four groups E, F, G, H formed by electrically equivalent pixels.

E: pixels 61, 63, 67, 69

F: pixels 62, 68

G: pixels 64, 66

H: pixel 65

The ratio of the areas of those four groups of pixels is as follows.

E:F:G:H=64:16:4:1

In this embodiment, the respective pixels are displayed with four gray levels by the well known technique. The pixels included in each group are displayed with the same gray level.

This embodiment corresponds to the case of m=n=4. Consequently, each group of pixels is displayed with four gray levels in the STN-LCD of this embodiment, whereby display with $4^4$=256 gray levels can be effected. In the STN-LCD of this embodiment as well, the center of the display unit coincides with the center of the intermediate density for all the gray levels in the same manner as in the third embodiment. Therefore, an excellent quality of display can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display apparatus, comprising:

a plurality of scan electrodes arranged in parallel in a first direction;

a plurality of data electrodes arranged in parallel in a second direction perpendicular to said plurality of scan electrodes, said plurality of scan electrodes and said plurality of data electrodes being utilized in a set of three electrodes each, thereby defining a 3×3 matrix of rows and columns of picture elements, said matrix of picture elements further comprising, a first group of pixels consisting of corner pixels of said matrix, a second group of pixels consisting of first and third pixels of a second row of said matrix, a third group of pixels consisting of first and third pixels of a second column of said matrix, a fourth pixel group consisting of a center pixel of said matrix, drive means for driving selected ones of said scan and data electrodes to display picture elements selected based upon a desired gray level display, wherein said first and second groups of pixels comprise mutually equal sized pixels of a first size and said third and fourth groups of pixels comprise mutually equal sized pixels of a second size, said first size being greater than said second size, and wherein the ratio of the sums of the areas of the pixels of said first, second, third and fourth groups of pixels is defined by the expression:

A:B:C:D=8:4:2:1 where A is the area of the first group of pixels, B is the area of the second group of pixels, C is the area of the third group of pixels, and D is the area of the fourth pixel group, thereby effecting a display having 16 gray levels.

2. A liquid crystal display apparatus, comprising:

a plurality of scan electrodes arranged in parallel in a first direction;

a plurality of data electrodes arranged in parallel in a second direction perpendicular to said plurality of scan electrodes, said plurality of scan electrodes and said plurality of data electrodes being utilized in a set of three electrodes each, thereby defining a 3×3 matrix of rows and columns of picture elements, said matrix of picture elements further comprising, a first group of pixels consisting of corner pixels of said matrix, a second group of pixels consisting of first and third pixels of a second row of said matrix, a third group of pixels consisting of first and third pixels of a second column of said matrix, a fourth pixel group consisting of a center pixel of said matrix, drive means for driving selected ones of said scan and data electrodes to display picture elements selected based upon a desired gray level display, wherein said first group of pixels comprises pixels of a first size, said second group of pixels comprises pixels of a second size, and said third group of pixels comprises pixels of a third size, and said fourth group of pixels comprises pixels of a fourth size, said first group of pixels being greater in size than said second, third and fourth groups, said second group of pixels being greater in size than said third and fourth groups, and said third group of pixels is greater in size than said fourth group, and wherein the ratio of the sums of the areas of said first, second, third and fourth groups of pixels is defined by the expression:

$$E:F:G:H = 64:16:4:1$$

where E is the area of the first group of pixels, F is the area of the second group of pixels, G is the area of the third group of pixels, and H is the area of the fourth pixel group, thereby effecting a display having 256 gray levels.

\* \* \* \* \*